(12) United States Patent
Liu et al.

(10) Patent No.: US 10,899,602 B1
(45) Date of Patent: Jan. 26, 2021

(54) SUBMARINE HOSE CONFIGURATION FOR TRANSFERRING A GAS FROM A BUOY

(71) Applicant: SOFEC, INC., Houston, TX (US)

(72) Inventors: Yonghui Liu, Houston, TX (US); Martin Matthew Duensing, Cypress, TX (US); Heejung Lee, Katy, TX (US)

(73) Assignee: SOFEC, INC., Houston, TX (US)

( * ) Notice: Subject to any disclaimer, the term of this patent is extended or adjusted under 35 U.S.C. 154(b) by 0 days.

(21) Appl. No.: 16/739,470

(22) Filed: Jan. 10, 2020

Related U.S. Application Data

(60) Provisional application No. 62/944,240, filed on Dec. 5, 2019.

(51) Int. Cl.
| | | |
|---|---|---|
| *B67D 9/00* | (2010.01) | |
| *B63B 27/32* | (2006.01) | |
| *F16L 1/24* | (2006.01) | |
| *F16L 1/15* | (2006.01) | |
| *F16L 1/16* | (2006.01) | |
| *B63B 27/25* | (2006.01) | |

(52) U.S. Cl.
CPC ............... *B67D 9/00* (2013.01); *B63B 27/25* (2013.01); *B63B 27/32* (2013.01); *F16L 1/15* (2013.01); *F16L 1/16* (2013.01); *F16L 1/24* (2013.01)

(58) Field of Classification Search
CPC .. B67D 9/00; B67D 9/02; B63B 27/25; B63B 27/30; B63B 27/32; B63B 27/34; B63B 22/021; B63B 22/023; B63B 22/025; B63B 22/026; F16L 1/14; F16L 1/15; F16L 1/16; F16L 1/24
See application file for complete search history.

(56) References Cited

U.S. PATENT DOCUMENTS

| | | |
|---|---|---|
| 3,118,155 A | 1/1964 | Siegel |
| 3,236,267 A | 2/1966 | Bily |
| 3,602,174 A | 8/1971 | Gorman |

(Continued)

FOREIGN PATENT DOCUMENTS

| | | |
|---|---|---|
| EP | 0796784 A1 | 9/1997 |
| EP | 1178922 B1 | 8/2004 |

(Continued)

OTHER PUBLICATIONS

PCT Written Opinion and International Search Report of international application No. PCT/US2010/060104 dated Feb. 14, 2011.

*Primary Examiner* — Andrew D StClair
(74) *Attorney, Agent, or Firm* — Edmonds & Cmaidalka, P.C.

(57) ABSTRACT

Systems and processes for transferring a gas from a buoy. In one embodiment, the system can include a buoy floating in water. A fluid swivel assembly can be coupled to the buoy. The system can also include a gas submarine conduit and a pipeline end manifold located at a subsea location. The gas submarine conduit can be configured to transfer a gas between the fluid swivel assembly and the pipeline end manifold. The gas submarine conduit can include one or more negatively buoyant members coupled thereto. The one or more negatively buoyant members coupled to the gas submarine conduit can urge the gas submarine conduit toward a seafloor to maintain the gas submarine conduit in a Chinese lantern configuration.

8 Claims, 10 Drawing Sheets

(56) References Cited

U.S. PATENT DOCUMENTS

| | | | |
|---|---|---|---|
| 3,641,602 A * | 2/1972 | Flory | B63B 22/021 441/5 |
| 3,677,310 A | 7/1972 | Dobler et al. | |
| 3,722,223 A | 3/1973 | Gratz | |
| 3,840,927 A | 10/1974 | Reid, Jr. | |
| 3,979,785 A | 9/1976 | Flory | |
| 4,065,822 A * | 1/1978 | Wilbourn | B63B 22/021 114/230.22 |
| 4,173,804 A | 11/1979 | Duc | |
| 4,176,615 A | 12/1979 | Reid et al. | |
| 4,176,986 A | 12/1979 | Taft et al. | |
| 4,226,204 A | 10/1980 | Tuson | |
| 4,320,545 A | 3/1982 | Pomonik | |
| 4,321,720 A | 3/1982 | Havre | |
| 4,339,002 A * | 7/1982 | Gibbs | B63B 22/021 166/355 |
| 4,490,121 A | 12/1984 | Coppens et al. | |
| 4,516,942 A | 5/1985 | Pedersen | |
| 4,530,302 A | 7/1985 | Pedersen | |
| 4,556,340 A * | 12/1985 | Morton | E21B 33/076 405/224.2 |
| 4,568,295 A | 2/1986 | Poldervaart | |
| 4,637,335 A | 1/1987 | Pollack | |
| 4,648,848 A * | 3/1987 | Busch | E21B 17/015 441/5 |
| 4,825,797 A | 5/1989 | Poldervaart et al. | |
| 4,836,813 A | 6/1989 | Poldervaart | |
| 4,891,495 A | 1/1990 | Araki | |
| 4,892,495 A | 1/1990 | Svensen | |
| 4,906,137 A * | 3/1990 | Maloberti | E21B 17/015 405/224.3 |
| 5,564,957 A | 10/1996 | Breivik et al. | |
| 5,927,224 A | 7/1999 | Etheridge et al. | |
| 6,021,848 A * | 2/2000 | Breivik | B63B 21/508 166/344 |
| 6,109,989 A | 8/2000 | Kelm et al. | |
| 6,227,135 B1 | 5/2001 | Pedersen | |
| 6,415,828 B1 * | 7/2002 | Duggal | B63B 22/021 141/279 |
| 6,439,147 B2 | 8/2002 | Cottrell et al. | |
| 6,558,215 B1 * | 5/2003 | Boatman | B63B 21/508 114/230.13 |
| 6,688,930 B2 | 2/2004 | Cottrell et al. | |
| 6,932,015 B2 | 8/2005 | Storvoll et al. | |
| 7,416,025 B2 * | 8/2008 | Bhat | B63B 21/502 166/355 |
| 8,430,170 B2 * | 4/2013 | Pionetti | E21B 17/01 166/350 |
| 8,763,549 B2 | 7/2014 | Liu et al. | |
| 2001/0029879 A1 | 10/2001 | Cottrell et al. | |
| 2004/0094082 A1 | 5/2004 | Boatman et al. | |
| 2008/0131210 A1 * | 6/2008 | Wajnikonis | B63B 21/502 405/211 |
| 2011/0209869 A1 * | 9/2011 | Smith | E21B 43/243 166/260 |
| 2013/0240085 A1 * | 9/2013 | Hallot | B63B 27/24 141/311 R |

FOREIGN PATENT DOCUMENTS

| | | |
|---|---|---|
| WO | 97/00806 | 1/1997 |
| WO | 99/57413 | 11/1999 |

* cited by examiner

SUBMARINE HOSE CONFIGURATION FOR TRANSFERRING A GAS FROM A BUOY

CROSS-REFERENCE TO RELATED APPLICATION

This application claims priority to U.S. Provisional Patent Application No. 62/944,240, filed on Dec. 5, 2019, which is incorporated by reference herein.

BACKGROUND

Field

Embodiments described generally relate to offshore single point mooring marine terminals. More particularly, such embodiments relate to offshore mooring buoys configured to transfer fluids to and from a vessel moored thereto and processes for using same.

Description of the Related Art

In the drilling, production, and transportation of offshore liquid hydrocarbons, mooring buoys have been used to connect floating vessels to loading/unloading capabilities away from shore. A single point mooring (SPM) marine terminal includes a loading/unloading buoy anchored offshore that serves as a mooring link between geostatic subsea pipeline end manifold (PLEM) connections and the floating vessels. The buoy includes a material transfer system that transports liquid hydrocarbons between the pipeline end manifold and the vessel, for example from the pipeline end manifold into a vessel storage tank. The buoy connects to the pipeline end manifold using one or more submarine conduits, riser lines, or hoses. The pipeline end manifolds connect to pipelines that carry liquid hydrocarbons to and from near-shore or on-shore facilities or locations for distribution and/or processing.

During loading operations, a vessel is moored to a conventional single point mooring marine terminal. One or more floating transport lines or hoses are placed in fluid communication with the vessel storage tank and the single point mooring marine terminal. Liquid hydrocarbons are then conveyed from the pipeline, through the submarine lines, through the buoy, through the floating transport lines, and into the vessel storage tank(s). Conventional liquid hydrocarbon carrying vessel storage tanks are designed to safely operate within specified pressure ranges. As the liquid hydrocarbon is introduced into the vessel storage tank gas within the tank is displaced such that a pressure within the vessel storage tank can be maintained within the specified ranges. Current processes for controlling the pressure within the tank include venting, displacing, or discharging the vapors/gases directly to the atmosphere.

There is a need, therefore, for improved systems and processes for capturing gas displaced from vessel storage tanks during loading operations that avoid or substantially reduce gases from being introduced into the atmosphere.

SUMMARY

Systems and processes for transferring a gas from a buoy are provided. In one embodiment, the system can include a buoy floating in water. A fluid swivel assembly can be coupled to the buoy. The system can also include a gas submarine conduit and a pipeline end manifold located at a subsea location. The gas submarine conduit can be configured to transfer a gas between the fluid swivel assembly and the pipeline end manifold. The gas submarine conduit can include one or more negatively buoyant members coupled thereto. The one or more negatively buoyant members coupled to the gas submarine conduit can urge the gas submarine conduit toward a seafloor to maintain the gas submarine conduit in a Chinese lantern configuration.

In one embodiment, the process can include displacing a gas from a vessel storage tank by flowing a liquid into the vessel storage tank. The gas can flow from the vessel storage tank through a floating buoy to a gas pipeline end manifold located subsea. The gas can flow through a gas transfer conduit that can be in fluid communication with the vessel storage tank and the floating buoy, through the floating buoy, and through a gas submarine conduit that can be in fluid communication with the floating buoy and the gas pipeline end manifold. The gas submarine conduit can be configured in a Chinese lantern configuration between the floating buoy and the gas pipeline end manifold.

In one embodiment, the process can include displacing a gas from a vessel storage tank by flowing a liquid into the vessel storage tank. The gas can flow from the vessel storage tank through a floating buoy to a gas pipeline end manifold located subsea. The floating buoy can include a rotatable turntable. The rotatable turntable can include a fluid swivel assembly coupled thereto. The displaced gas can flow through a gas transfer conduit that is in fluid communication with the vessel storage tank and the fluid swivel assembly. The displaced gas can flow through the fluid swivel assembly and through a gas submarine conduit that is in fluid communication with the fluid swivel assembly and the gas pipeline end manifold. The gas submarine conduit can be configured in a Chinese lantern configuration between the floating buoy and the gas pipeline end manifold. The liquid can flow from a liquid pipeline end manifold located subsea, through a liquid submarine conduit that is in fluid communication with the liquid pipeline end manifold and the fluid swivel assembly, through the fluid swivel assembly, and through a liquid transfer conduit that is in fluid communication with the fluid swivel assembly and the vessel storage tank. The liquid submarine conduit can be configured in a Chinese lantern configuration, a steep-S configuration, or a lazy-S configuration between the buoy and the second subsea location.

BRIEF DESCRIPTION OF THE DRAWINGS

The various aspects and advantages of the preferred embodiment of the present invention will become apparent to those skilled in the art upon an understanding of the following detailed description of the invention, read in light of the accompanying drawings which are made a part of this specification.

DETAILED DESCRIPTION

Figure 1:
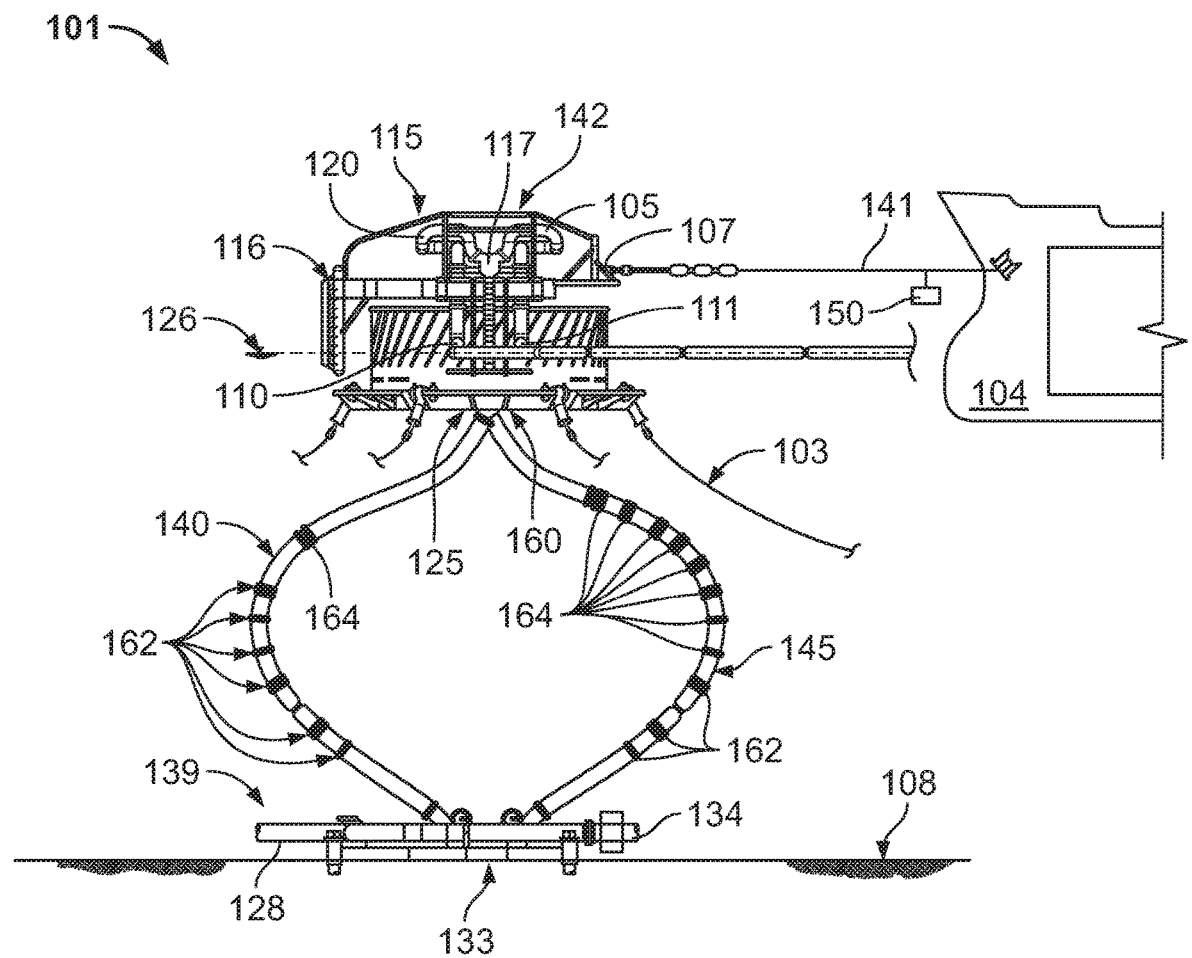
FIG. 1 depicts a schematic elevation view of an illustrative single point mooring marine terminal that includes a buoy for conveying a gas from a floating vessel to a subsea location, according to one or more embodiments.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to." Also, as used herein the indefinite articles 'a' and 'an' should be interpreted to mean "at least one" or "one or more."

All numerical values in this disclosure are exact or approximate values ("about") unless otherwise specifically stated. Accordingly, various embodiments of the disclosure may deviate from the numbers, values, and ranges disclosed herein without departing from the intended scope.

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the apparatus and methods of using the same may be equally effective at various angles or orientations.

FIG. 1 depicts a schematic elevation view of an illustrative single point mooring marine terminal 101 that includes a buoy 115, for conveying a gas from a floating vessel 104 to a subsea location 139, according to one or more embodiments. The buoy 115 can float in a body of water 126. The buoy 115 can be coupled or otherwise secured to a seafloor 108 by one or more anchor legs 103. The buoy 115 can be held in a relatively geostationary condition by the one or more anchor legs 103. A floating vessel 104 can be moored to the buoy 115. In some examples, the vessel 104 can be moored to the buoy 115 via a hawser arrangement 141.

The hawser arrangement 141 can be or can include nylon rope that can be shackled to a mooring uni-joint 107 on the buoy 115. A load pin 150 can be applied to the hawser arrangement 141 to measure hawser loads. The hawser arrangement 141 can be adapted or configured with one or more ropes depending, at least in part, on the tonnage of the floating vessel 104. The ropes can be single-leg or grommet leg type ropes. By "vessel" it can be meant any type of floating structure including but not limited to tankers, boats, ships, and the like.

The buoy 115 can be a catenary anchor leg mooring (CALM) type buoy, as depicted, or a single anchor leg mooring (SALM) type buoy as described below. In some examples, the buoy 115 can be or can include the turntable 116 rotatably coupled to the buoy 115, as depicted, which is typically referred to as a "turntable buoy". In other examples, the buoy 115 can be or can include a rotatable floating buoy coupled to a relatively geostationary turret, which is typically referred to as a "turret buoy". On a turret buoy, the turret can be suspended from a rotatable floating buoy and the turret can be coupled to the seafloor 108. A fluid swivel assembly 117 can be coupled to the turntable 116 or the rotatable floating buoy. As such, the buoy 115 can be what is typically called a turret buoy, a turntable buoy, or a single anchor leg mooring type buoy. The floating vessel 104 can be moored to the turntable 116 or the rotatable floating buoy and can weathervane about or with the turntable 116 or the rotatable floating buoy, respectively.

The fluid swivel assembly 117 can include a first swivel section rotatably coupled to a second swivel section. A first gas transfer conduit 120 can be in fluid communication with the first swivel section and a second gas transfer conduit 125 can be in fluid communication with the second swivel section. The first gas transfer conduit 120 and the second gas transfer conduit 125 can be in fluid communication with a first flow path defined by the fluid swivel assembly 117. The fluid swivel assembly 117 can be adapted or configured to maintain fluid communication between the first gas transfer conduit 120 and the second gas transfer conduit 125 during rotation therebetween and when there is no rotation therebetween.

In some embodiments, the fluid swivel assembly 117 can also include a first liquid transfer conduit 160 and a second liquid transfer conduit 105. The first liquid transfer conduit 160 can be in fluid communication with the second swivel section and the second liquid transfer conduit 105 can be in fluid communication with the first swivel section. The first liquid transfer conduit 160 and the second liquid transfer conduit 105 can be in fluid communication with a second flow path defined by the fluid swivel assembly 117. The fluid swivel assembly 117 can be adapted or configured to maintain fluid communication between the first liquid transfer conduit 160 and the second liquid transfer conduit 105 during rotation therebetween and when there is no rotation therebetween.

A first floating conduit 110 can be in fluid communication with the first gas transfer conduit 120. For example, an end of the first gas transfer conduit 120 can be coupled to an end of the first floating conduit 110. As further described below, the first floating conduit 110 can be adapted or configured to convey a gas from the vessel 104 and into the first gas transfer conduit 120. In some embodiments, a second floating conduit 111 can be in fluid communication with the second liquid transfer conduit 105. As further described below, the second floating conduit 111 can be adapted or configured to convey a liquid to the vessel 104. An end of the second liquid transfer conduit 105 can be coupled to an end of the second floating conduit 111.

The second gas transfer conduit 125 can be in fluid communication with a gas submarine conduit 140, a pipeline end manifold 133, and a gas pipeline 134 located at the subsea location 139. The gas submarine conduit 140 can be adapted or configured to transfer the gas from the second gas transfer conduit in fluid communication with the fluid swivel assembly 117 to the pipeline end manifold 133. As such, in some embodiments, the first floating conduit 110, the first gas transfer conduit 120, the fluid assembly 117, the second gas transfer conduit 125, and the gas submarine conduit 140 can be adapted or configured to convey the gas from the vessel 104 to the subsea location 139, e.g., the pipeline end manifold 133. In some embodiments, the first liquid transfer conduit 160 can be in fluid communication with a liquid submarine conduit 145, the pipeline end manifold 133, and a liquid pipeline 128. The liquid submarine conduit 145 can be adapted or configured to transfer a liquid, e.g., a liquid hydrocarbon, from the pipeline end manifold 133 to the fluid swivel assembly 117. As such, in some embodiments, the second floating conduit 111, the first liquid transfer conduit 160, the fluid swivel assembly 117, the second liquid transfer conduit 105, and the liquid submarine conduit 145 can be adapted or configured to convey the liquid from the subsea location 139, e.g., the pipeline end manifold 133, to the vessel 104.

In some examples, the gas submarine conduit 140 can be configured in a Chinese lantern configuration between the buoy 115 and the subsea location 139. The gas submarine conduit 140 can include one or more negatively buoyant members 162 coupled thereto between the pipeline end manifold 133 and the second gas transfer conduit 125. In some examples, the one or more negatively buoyant members 162 can be coupled to the gas submarine conduit 140 between the pipeline end manifold 133 and a midpoint of the gas submarine conduit 140. In other examples, one or more negatively buoyant members 162 can be coupled to the gas submarine conduit 140 between the pipeline end manifold 133 and the midpoint of the gas submarine conduit 140 and one or more negatively buoyant members 162 can be coupled to the gas submarine conduit 140 between the midpoint and the second gas transfer conduit 125. In still other examples, the gas submarine conduit 140 can include one or more negatively buoyant members 162 and one or more positively buoyant members 164 coupled thereto between the pipeline end manifold 133 and the second gas transfer conduit 125. In some embodiments, the positively buoyant member(s), if present, can be located between the midpoint and the second gas transfer conduit 125, between the pipeline end manifold 133 and the midpoint, or a combination thereof. As such, in some embodiments, one or more negatively buoyant members 162 and, optionally, one or more positively buoyant members 164 can be distributed along the gas submarine conduit 125 to maintain the gas submarine conduit 140 in the Chinese lantern configuration.

The one or more negatively buoyant members 162 can urge the gas submarine conduit 140 toward a seafloor 108 to maintain the gas submarine conduit 140 in the Chinese lantern configuration. Similarly, the one or more negatively buoyant members 162 and the optional one or more positively buoyant members 164 can urge the gas submarine conduit 140 toward a seafloor 108 and away from the seafloor 108, respectively, to maintain the gas submarine conduit 140 in the Chinese lantern configuration. In other examples, the gas submarine conduit 140 can be adapted or configured in a steep-S configuration or a lazy-S configuration between the buoy 115 and the subsea location 139. The gas submarine conduit 140 can be adapted or configured to convey the gas from the fluid swivel assembly 117 to the subsea location 139, e.g., the pipeline end manifold 133. The one or more negatively buoyant members 162 can be made from any suitable material that can sink in water, including sea water. For example, the one or more negatively buoyant members 162 can be made from or include metal chains, cement, lead, natural stone, metal alloy, or other suitable materials. The one or more optional positively buoyant members 164 can be made from or include syntactic foams, foamed thermoset or thermoplastic materials, thermoset or thermoplastic materials filled with particles (such as glass, plastic, micro-spheres, and/or ceramics), rubber, nylon, composites of these materials, any other material buoyant in water, e.g., sea water, or any combination thereof.

The liquid submarine conduit 145 can be coupled between the pipeline end manifold 133 and the first liquid transfer conduit 160. The liquid submarine conduit 145 can be adapted or configured in a Chinese lantern configuration, a steep-S configuration, or a lazy-S configuration between the buoy 115 and the subsea location 139. For example, one or more negatively buoyant members 162 and one or more positively buoyant members 164 can be distributed along the liquid submarine conduit 145 to maintain the liquid submarine conduit 145 in the Chinese lantern configuration, the steep-S configuration, or the lazy-S configuration. The liquid submarine conduit 145 can be adapted or configured to convey the liquid from the subsea location 139, e.g., the pipeline end manifold 133, to the fluid swivel assembly 117.

The gas submarine conduit 140 and the liquid submarine conduit 145 can be adapted or configured to compensate for motions of the buoy 115. The gas submarine conduit 140 and liquid submarine conduit 145 can be flexible and can be any type of elongated conduit. The first floating conduit 110, the second floating conduit 111, the gas submarine conduit 140, and the liquid submarine conduit 145 can be made from any suitable material. For example, the first floating conduit 110, the second floating conduit 111, the gas submarine conduit 140, and the liquid submarine conduit 145 can be made from a synthetic fiber such as polyester or nylon filament, rubber, synthetic rubbers, metal alloys, or other suitable materials. It should be understood that any of the conduits, e.g., the first floating conduit 110, the second floating conduit 111, the gas submarine conduit 140, the liquid submarine conduit 145, etc., can each be or can each include a plurality of conduit segments connected together.

The first floating conduit 110 and the gas submarine conduit 140 can convey fluids such as the gas discharged from the floating vessel 104. In some examples, the gas can be or can include an exhaust gas, air, an inert gas such as nitrogen or carbon dioxide, hydrocarbon gas, or any mixture thereof. In some examples, the exhaust gas can be from the vessel 104 and can include one or more contaminants. Such contaminants can be or can include, but are not limited to, oxides of sulfur (SOx), oxides of nitrogen (NOx), carbon monoxide, carbon dioxide, hydrocarbons, and carbon particles suspended in the gas, or any mixture thereof. The second floating conduit 111 and the liquid submarine conduit 145 can also convey fluids such as the liquid. The liquid can be or can include, but is not limited to, water, raw hydrocarbons such as crude oil or a fraction thereof, refined hydrocarbons such as, but not limited to, diesel fuel, jet fuel, kerosene, and/or gasoline, or any mixture thereof.

In some embodiments, electric power for safety lights and other equipment can be provided by a solar panel and power storage assembly 142 disposed on the buoy 115, for example on an upper surface of the buoy 115. In other examples, the electrical power can be provided via a power cable from an alternate location, for example, on-shore or the near-by platform.

Figure 2:
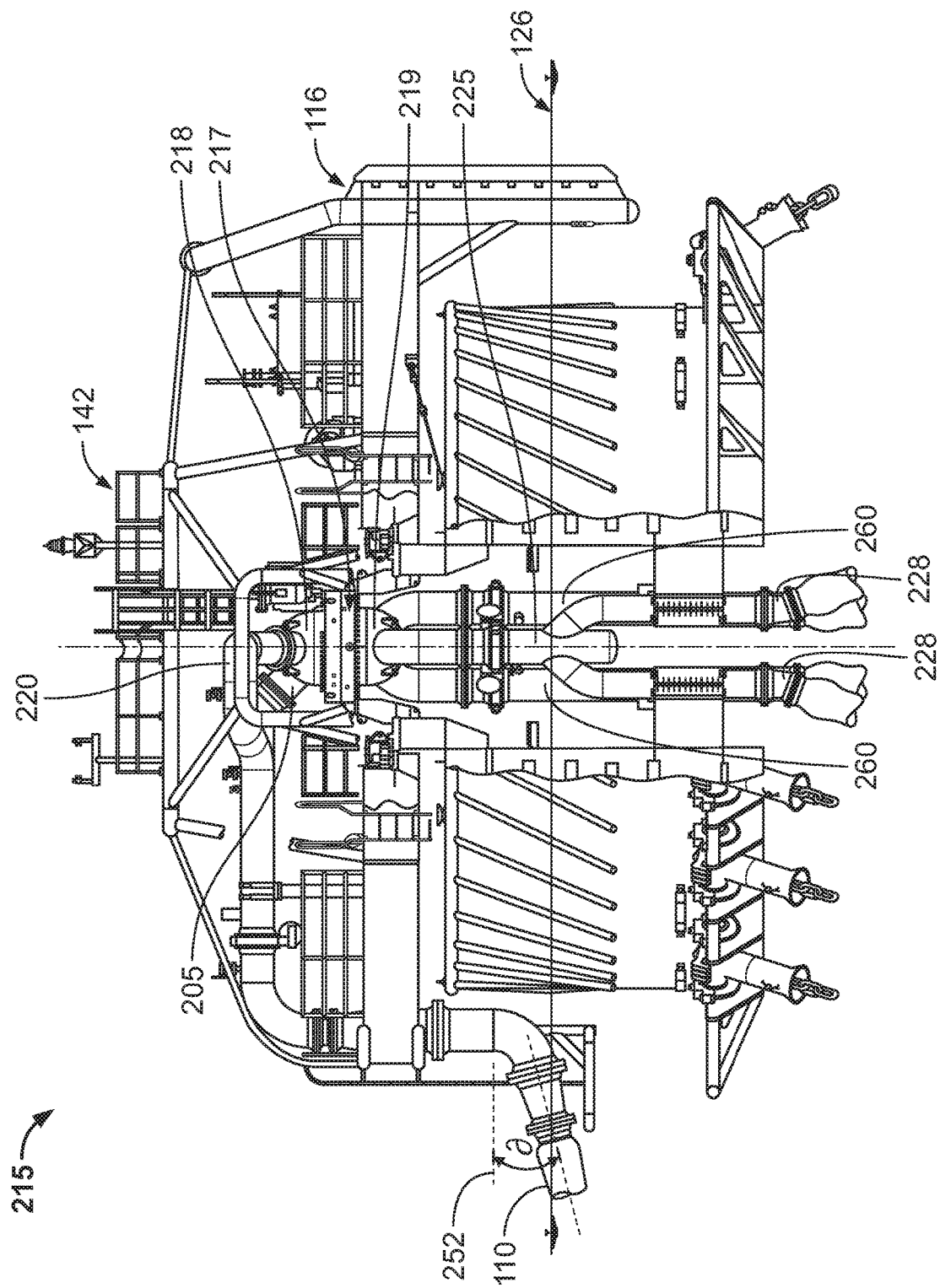
FIG. 2 depicts a schematic elevation view of another illustrative buoy, according to one or more embodiments.
Figure 3:
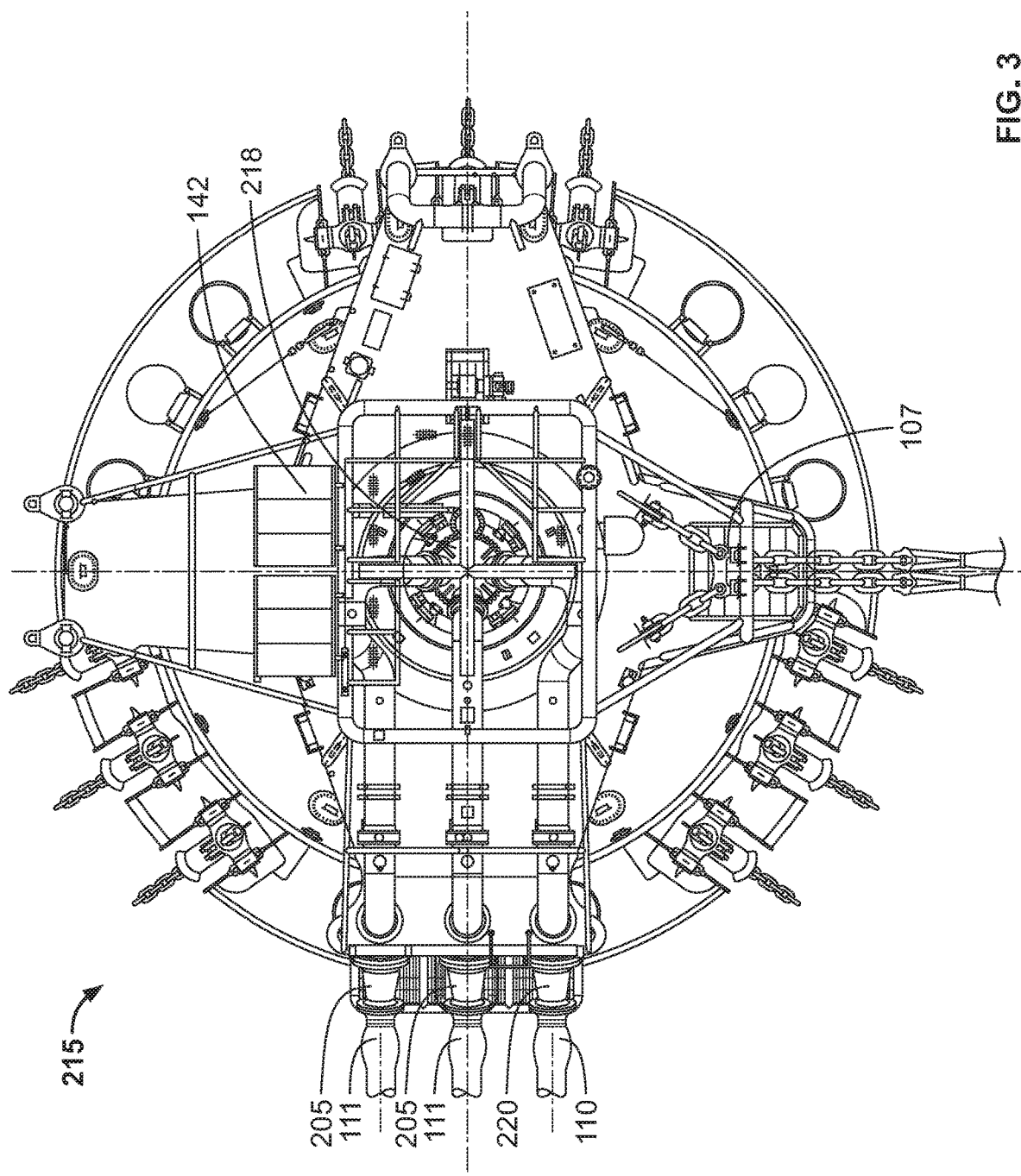
FIG. 3 depicts a schematic plan view of the buoy shown in FIG. 2.

FIG. 2 depicts a schematic elevation view of another illustrative buoy 215, according to one or more embodiments. FIG. 3 depicts a schematic plan view of the buoy 215 shown in FIG. 2. The buoy 215 can be substantially similar to buoy 115. The buoy 215 can include a fluid swivel assembly 217 coupled thereto. The fluid swivel assembly 217 can include a first swivel section 218 rotatably coupled to a second swivel section 219. A first gas transfer conduit 220 can be in fluid communication with the first swivel section 218 and a second gas transfer conduit 225 can be in fluid communication with the second swivel section 219. The first gas transfer conduit 220 can be in fluid communication with a first flow path defined by the first swivel section 218 and the second gas transfer conduit 225 can be in fluid communication with a first flow path defined by the second swivel section 219. In some examples, the second gas transfer conduit 225 can extend from the second swivel section 219 and transition into two or more second gas transfer conduits 228 (two are shown). The first swivel section 218 and the second swivel section 219 can be adapted or configured to maintain fluid communication between the first gas transfer conduit 220 and the second gas transfer conduit 225 during rotation therebetween and when there is no rotation therebetween.

A first liquid transfer conduit 260 (two are shown) and a second liquid transfer conduit 205 (two are shown) can also be coupled to the fluid swivel assembly 217 as discussed above with regard to FIG. 1. The first liquid transfer conduit 260 can be in fluid communication with the second swivel section 219 and the second liquid transfer conduit 205 can be in fluid communication with the first swivel section 218.

The first liquid transfer conduit 260 can be in fluid communication with a second flow path defined by the second swivel section 219 and the second liquid transfer conduit 205 can be in fluid communication with a second flow path defined by the first swivel section 218. The first swivel section 218 and the second swivel section 219 can be adapted or configured to maintain fluid communication between the first liquid transfer conduit 260 and the second liquid transfer conduit 205 during rotation therebetween and when there is no rotation therebetween.

Two or more second floating conduits 111 (two are shown) can be in fluid communication with the two or more second liquid transfer conduits 205 (two are shown). The end of the first gas transfer conduit 220 and the end of the second liquid transfer conduit 205 can have a declination angle $\partial$ relative to a local horizontal 252 of the buoy 215. Accordingly, a portion of the first floating conduit 110 can have the declination angle $\partial$. In some embodiments, the declination angle $\partial$ can be from about five degrees to about forty degrees from the local horizontal 252. It should be noted that the local horizontal 252 may stay static with regard to the buoy 215 while a declination angle relative to a surface of a body of water 126 may change with wave action and other perturbations of the buoy 215.

In some embodiments, electric power for safety lights and other equipment can be produced by a solar panel and power storage assembly 142 disposed on the buoy 215, for example on an upper surface of the buoy 215. In other examples, the electrical power can be provided via a power cable from an alternate location, for example, on-shore or a near-by platform.

Figure 4:
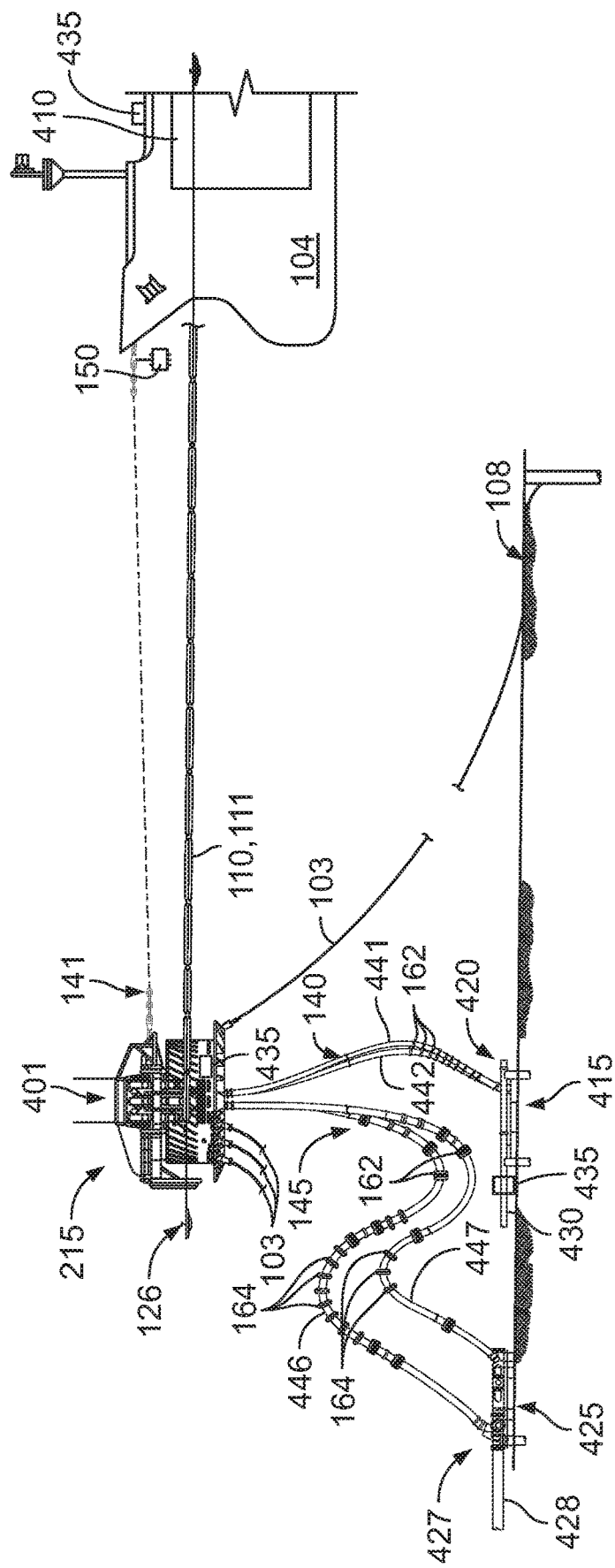
FIG. 4 depicts a schematic elevation view of another illustrative single point mooring marine terminal, according to one or more embodiments.
Figure 5:
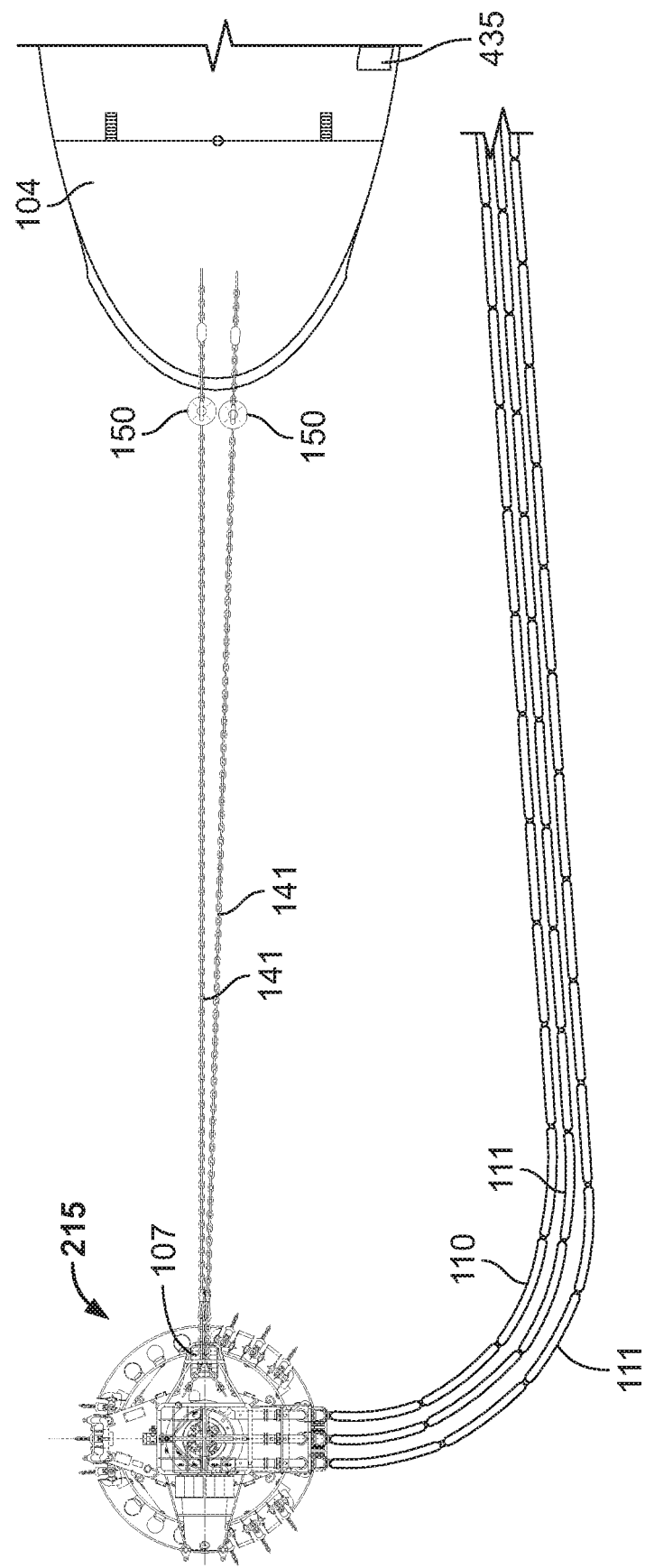
FIG. 5 depicts a schematic plan view of the single point mooring marine terminal shown in FIG. 4.

FIG. 4 depicts a schematic elevation view of another illustrative single point mooring marine terminal 401, according to one or more embodiments. FIG. 5 depicts a schematic plan view of the single point mooring marine terminal 401 shown in FIG. 4. The floating vessel 104 can include a vessel storage tank 410 that can include the gas. For example, the floating vessel 104 can be a floating production, storage, and offloading (FPSO) vessel, a floating storage and offloading (FSO) vessel, or a conventional liquid carrying tanker which may be a very large crude carriers (VLCC), and ultra large crude carriers (ULCCs) or any other size liquid carrying tanker.

Referring now to FIGS. 2, 4, and 5, in some examples, the second gas transfer conduit 225 can be in fluid communication with the gas submarine conduit 140 (two are shown) and a first pipeline end manifold 415 located at a first subsea location 420. The gas submarine conduit 140 can be coupled between the first pipeline end manifold 415 and the second gas transfer conduit 225 for fluid communication therebetween. As shown, the gas submarine conduit 140 can include a first submarine conduit 441 and a second submarine conduit 442. The gas submarine conduit 140 can be coupled between the first pipeline end manifold 415 and the two or more second gas transfer conduits 228 for fluid communication therebetween.

The first floating conduit 110 can be in fluid communication with the vessel storage tank 410. The second gas transfer conduit 225 can be in fluid communication with the first pipeline end manifold 415, e.g., via the gas submarine conduit 140. In some examples, the two or more second gas transfer conduits 228 can be in fluid communication with the first pipeline end manifold 415. The first floating conduit 110, the first gas transfer conduit 220, the second gas transfer conduit 225, and the gas submarine conduit 140 can be adapted or configured to transfer or convey the gas displaced or otherwise conveyed from the floating vessel 104, for example from the vessel storage tank 410, to the first pipeline end manifold 415 located at the first subsea location 420. The gas can be displaced from the vessel storage tank 410 to keep a pressure within the vessel storage tank 410 within specified ranges when introducing the liquid into the vessel storage tank 410.

The gas pipeline 430 can be in fluid communication with and span from the first pipeline end manifold 415 to another location, such as a near-shore or on-shore facility or location. The first floating conduit 110, the first gas transfer conduit 220, the second gas transfer conduit 225, the gas submarine conduit 140, the first pipeline end manifold 415, and the gas pipeline 430 can be adapted or configured to transfer or convey the gas from the floating vessel 104 and/or the vessel storage tank 410 to the near-shore or on-shore location.

The first liquid transfer conduit 260 can be in fluid communication with the liquid submarine conduit 145 (two are shown) and a second pipeline end manifold 425 located at a second subsea location 427. The second pipeline end manifold 425 can be in fluid communication with a liquid pipeline 428. The liquid pipeline 428 can be in fluid communication with and span from the second pipeline end manifold 425 to another location, such as the near-shore or on-shore facility or location. The second floating conduit 111 can be in fluid communication with the floating vessel 104 and/or the vessel storage tank 410. The liquid pipeline 428, the second pipeline end manifold 425, the liquid submarine conduit 145, the first liquid transfer conduit 260, the second liquid transfer conduit 205, and the second floating conduit 111 can be adapted or configured to convey the liquid, for example the liquid hydrocarbon, from the near-shore or on-shore location to the floating vessel 104 and/or the vessel storage tank 410. The gas in the vessel storage tank 410 can be displaced from the vessel storage tank 410 simultaneously with the introduction of the liquid into the vessel storage tank 410.

In some examples, the gas submarine conduit 140 can be configured in the Chinese lantern configuration between the buoy 215 and the first subsea location 420. For example, the first and second submarine conduits 441, 442 can each include one or more negatively buoyant members 162 coupled thereto between the first pipeline end manifold 415 and a midpoint of each of the first and second submarine conduits 441, 442. The one or more negatively buoyant members 162 can urge each of the first and second submarine conduits 441, 442 toward the seafloor 108 to maintain the first and second submarine conduits 441, 442 in the Chinese lantern configuration. In other examples, the gas submarine conduit 140 can be adapted or configured in a steep-S configuration or a lazy-S configuration between the buoy 215 and the first subsea location 420.

As shown, the liquid submarine conduit 145 can include a third submarine conduit 446 and a fourth submarine conduit 447. The third and fourth submarine conduits 446, 447 can independently be configured in the Chinese lantern configuration, the steep-S configuration, or the lazy-S configuration between the buoy 215 and the second subsea location 427. For example, one or more negatively buoyant members 162 and one or more positively buoyant members 164 can be distributed along each of the third and fourth submarine conduits 446, 447 to maintain the third and fourth submarine conduits 446, 447 in the Chinese lantern configuration, the steep-S configuration, or the lazy-S configuration.

In some examples, the pressure developed within the vessel storage tank 410 during liquid loading may not be sufficient to push the gas all the way through the gas pipeline 430. Accordingly, one or more blowers 435 (three are shown) can be used to maintain the pressure within the vessel storage tank 410 within specified design ranges and/or can be used to move or otherwise urge the gas from the vessel storage tank 410 through the pipeline 430. In some examples the blower 435 can be located at the first subsea location 420, on the buoy 215, floating adjacent the buoy 215, on the floating vessel 104, an adjacent platform, and/or on shore in fluid communication with the gas pipeline 430. The blower 435 can be adapted or configured to provide a propulsive force within the conduits to assist the gas conveyance through the pipeline 430. For example, the blower 435 can increase a mass flow of the gas that can be conveyed from the vessel storage tank 410 through the pipeline 430 to another location, such as the near-shore or on-shore facility or location. The blower 435 can induce or otherwise produce a partial vacuum and/or increase a pressure within the gas pipeline 430, the first pipeline end manifold 415, the gas submarine conduit 140, the second gas transfer conduit 225, the first gas transfer conduit 220 and/or the first floating conduit 110, to draw or otherwise urge the gas from the vessel 104 such that the gas can be conveyed to another location, such as the near-shore or on-shore facility or location. The gas, once conveyed to the near-shore or on-shore facility or location, can be processed to reduce or remove at least a portion of one or more contaminants therefrom. In some examples, the gas can be an exhaust gas from the vessel that can include one or more contaminants.

Figure 6:
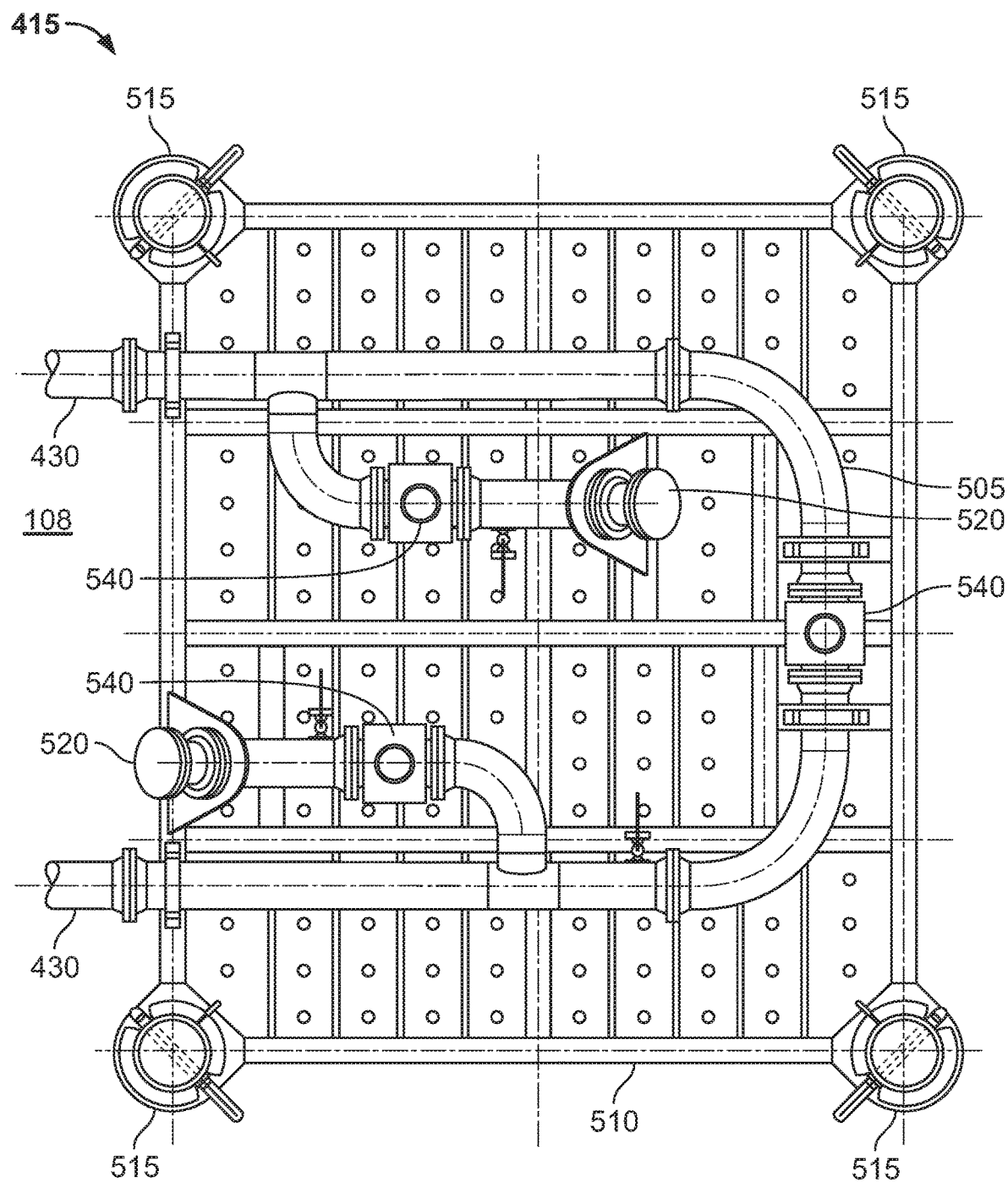
FIG. 6 depicts a schematic plan view of a first pipeline end manifold, according to one or more embodiments.
Figure 7:
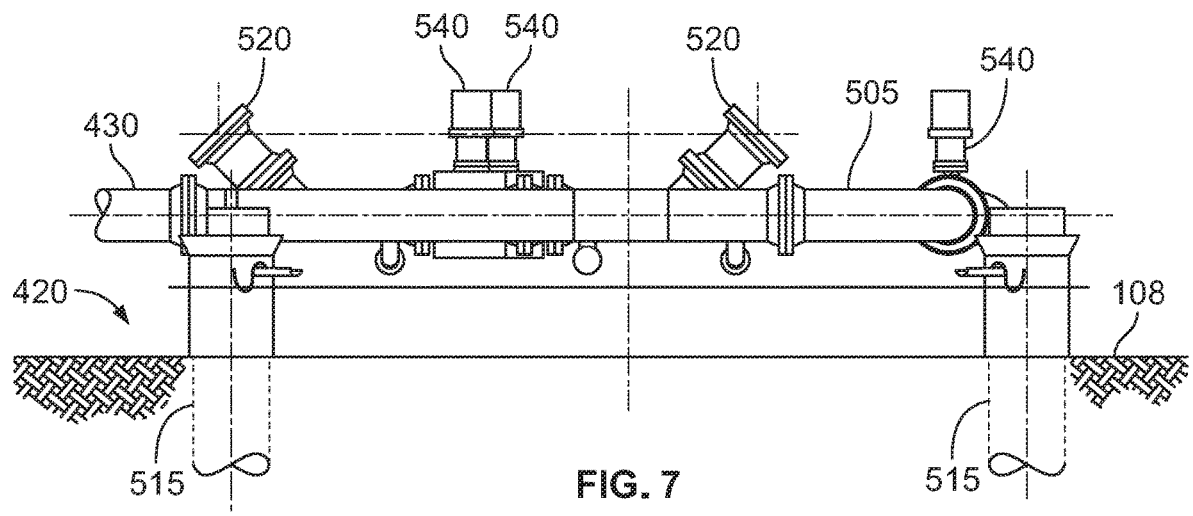
FIG. 7 depicts a schematic elevation view of the first pipeline end manifold shown in FIG. 6.

FIGS. 6 and 7 depict a schematic plan view and a schematic elevation view of the first pipeline end manifold 415, according to one or more embodiments. The first pipeline end manifold 415 can include a first pipeline end conduit 505 disposed on a skid 510. The skid 510 can be secured to the seafloor 108 by one or more piles 515 (four are shown) and/or ballast. The first pipeline end conduit 505 can include one or more valves 540 for fluid isolation within one or more portions of the first pipeline end conduit 505. One or more first interface connectors 520 (two are shown) can provide fluid communication from the first interface connectors 520 to the gas pipeline 430. The first pipeline end conduit 505 can have a U-shape or other curved shape to accommodate a pipeline pig for maintenance activities, for example for removal of a condensate from the first pipeline end manifold 415 and/or the gas pipeline 430. A protective cage can surround the first pipeline end conduit 505 and/or the first pipeline end manifold 415 for protection from various environmental hazards.

Figure 8:
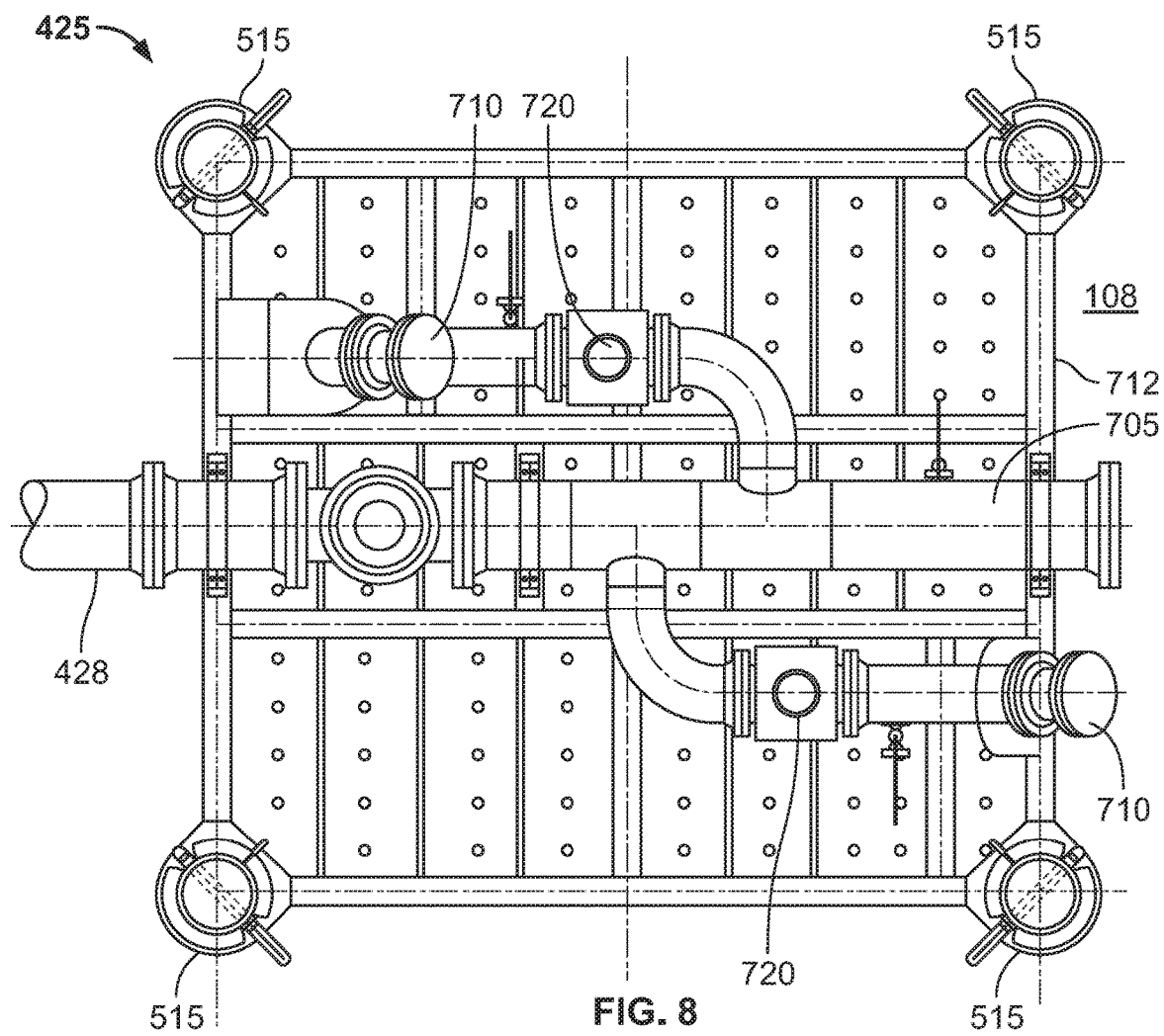
FIG. 8 depicts a schematic plan view of a second pipeline end manifold, according to one or more embodiments.
Figure 9:
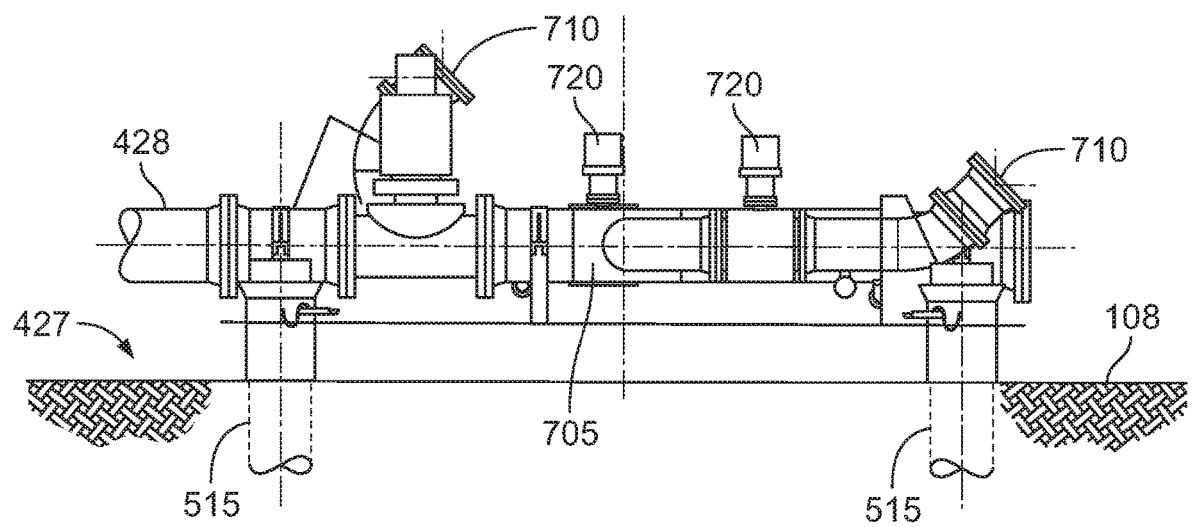
FIG. 9 depicts a schematic elevation view of the second pipeline end manifold shown in FIG. 8.

FIGS. 8 and 9 depict a schematic plan view and a schematic elevation view of the second pipeline end manifold 425, according to one or more embodiments. The second pipeline end manifold 425 can include a second pipeline end conduit 705 disposed on a skid 712. The skid 712 can be secured to the seafloor 108 by the one or more piles 515 (four are shown) and/or ballast. The second pipeline end conduit 705 can include one or more valves 720 for fluid isolation within one or more portions of the second pipeline end conduit 705. One or more second interface connectors 710 (two are shown) can provide fluid communication from the second interface connectors 710 to the liquid pipeline 428. A protective cage can surround the second pipeline end conduit 705 and/or the second pipeline end manifold 425 for protection from various environmental hazards.

It should be understood that although the first pipeline end manifold 415 and the second pipeline end manifold 425 are depicted as being located at two locations 420, 427 on two different skids 510, 712 at some distance from one another, the first and second pipeline end manifolds 415, 425 can be located adjacent each other and/or formed or assembled on a single skid adapted or configured to accommodate the first pipeline end conduit 505 and the second pipeline end conduit 705.

Figure 10:
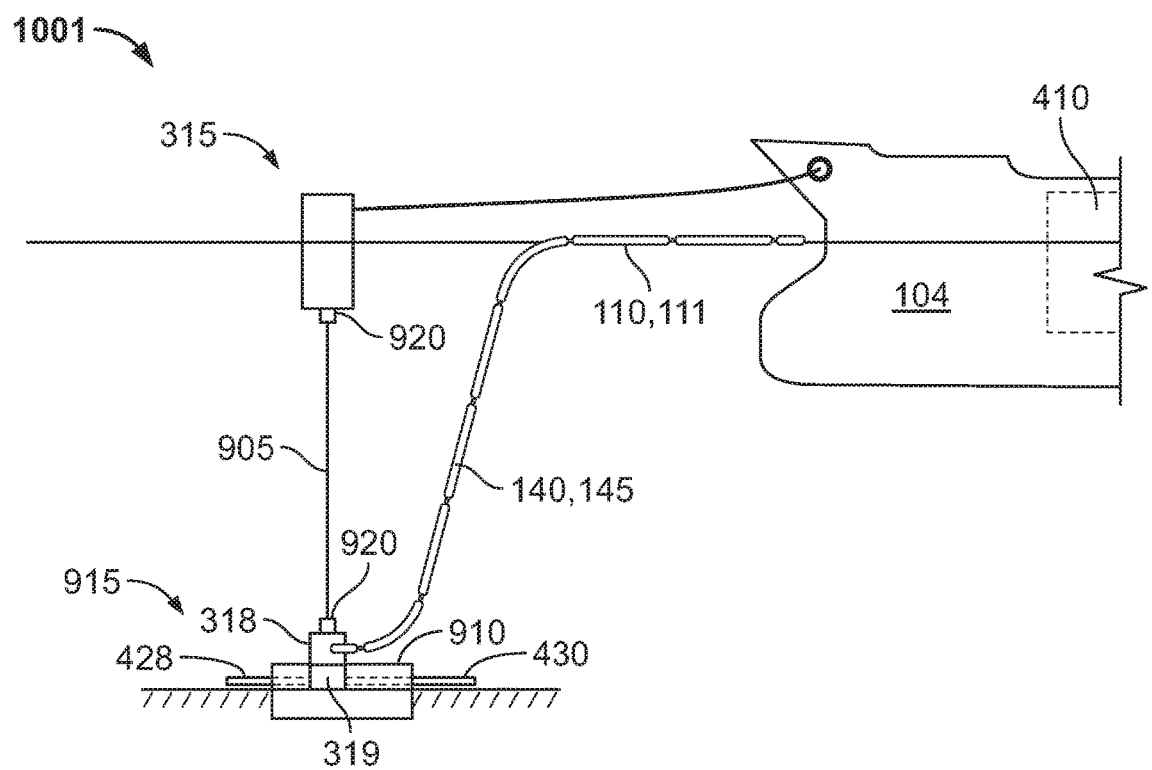
FIG. 10 depicts a schematic of another illustrative single point mooring marine terminal that includes a single anchor leg mooring (SALM) type buoy, according to one or more embodiments.

FIG. 10 depicts a schematic of another illustrative single point mooring marine terminal 1001 that includes a single anchor leg mooring (SALM) type buoy 315, according to one or more embodiments. The buoy 315 can be anchored to the seabed by a single anchor leg 905. The single anchor leg 905 can be connected to a base 910 which can be ballasted and/or piled to a subsea location 915. The single anchor leg 905 can be attached to the base 910 by either a chain or by an elongated conduit. One or more universal joints 920 (two are shown) can allow the buoy 315 and the floating vessel 104 to rotate about the anchor leg 905 and/or the base 910. The first floating conduit 110 can be coupled to and in fluid communication with the gas submarine conduit 140. The second floating conduit 111 can be coupled to and in fluid communication with the liquid submarine conduit 145. Although described as separate conduits, the first floating conduit 110 and the gas submarine conduit 140 can be combined into a single gas conveyance conduit and the second floating conduit 111 and the liquid submarine conduit 145 can be combined into single liquid conveyance conduit.

The gas submarine conduit 140 can be in fluid communication with a first swivel section 318 and the gas pipeline 430. The liquid submarine conduit 145 can be in fluid communication with the the first swivel section 318 and the liquid pipeline 428. The first swivel section 318 and a second swivel section 319 can be adapted or configured to maintain fluid communication between the gas submarine conduit 140 and the gas pipeline 430 during rotation therebetween and when there is no rotation therebetween. The first swivel section 318 and the second swivel section 319 can be adapted or configured to maintain fluid communication between the liquid submarine conduit 145 and the liquid pipeline 428 during rotation therebetween and when there is no rotation therebetween. The liquid can be conveyed from the liquid pipeline 428, through the liquid submarine conduit 145, through the second floating conduit 111 and to the floating vessel 104 and/or the vessel storage tank 410. Gas discharged from the floating vessel 104 and/or the vessel storage tank 410 can be conveyed through the first floating conduit 110, through the gas submarine conduit 140, through the gas pipeline 430 to another location, such as the near-shore or on-shore facility or location.

Figure 11:
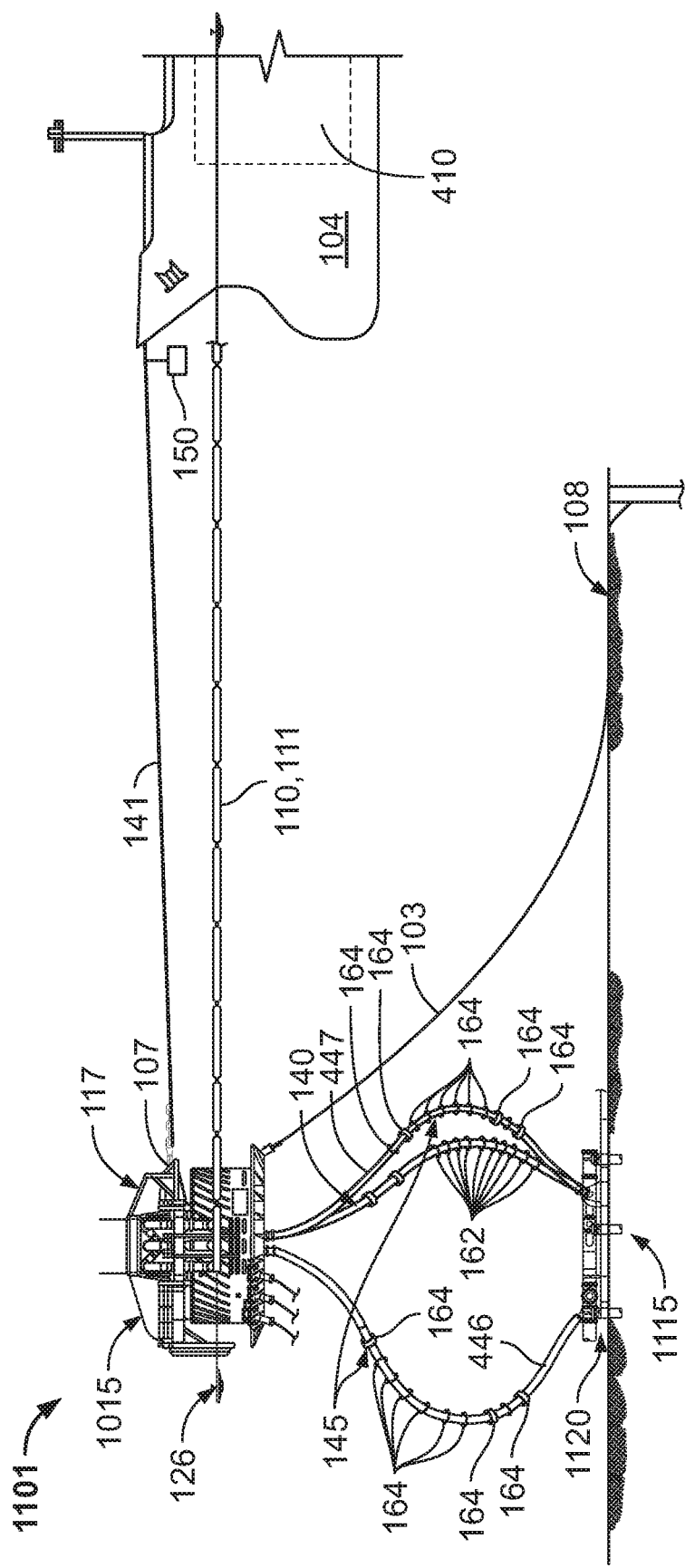
FIG. 11 depicts a schematic elevation view of yet another illustrative single point mooring terminal, including another illustrative buoy, according to one or more embodiments.
Figure 12:
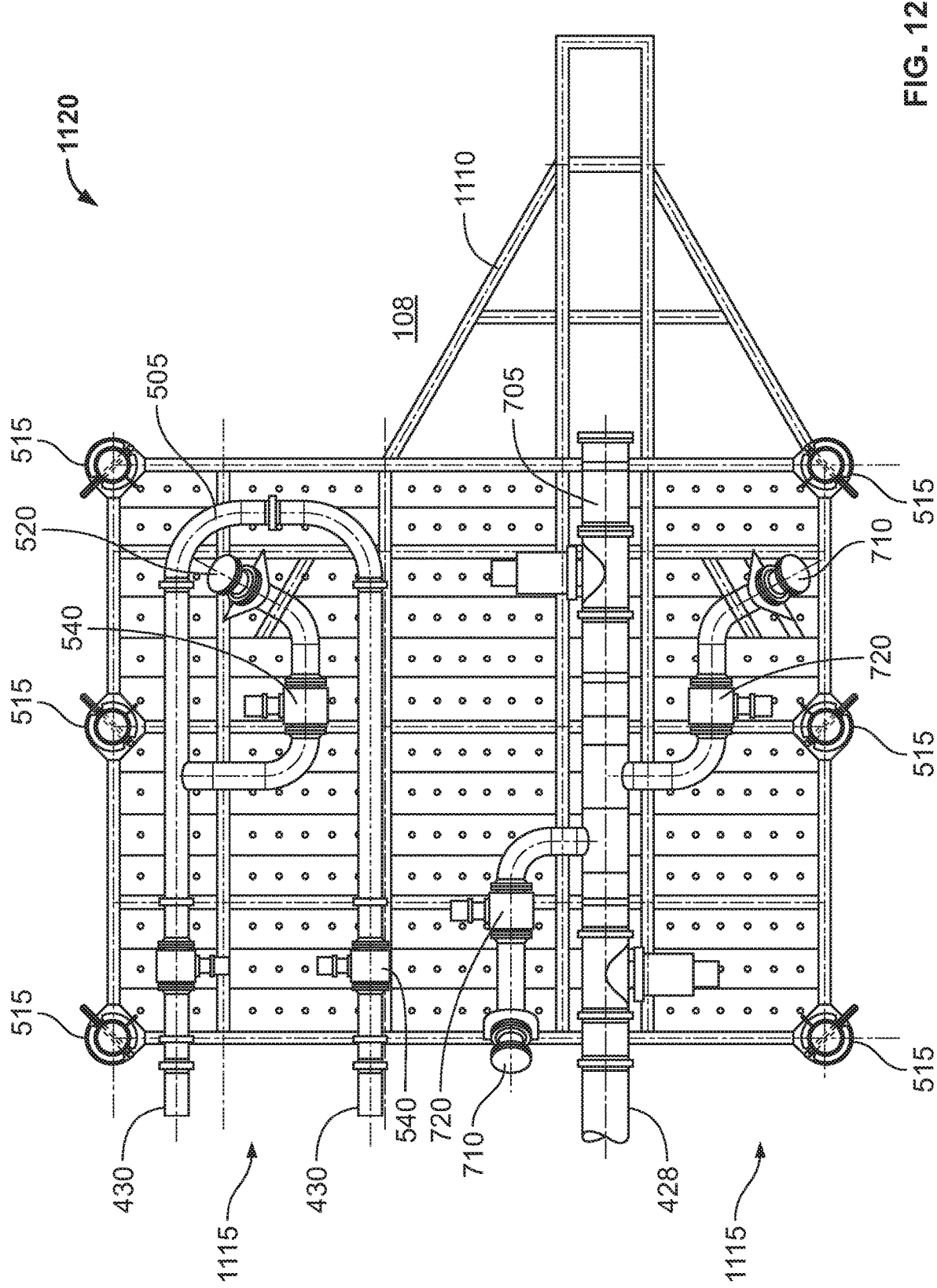
FIG. 12 depicts a schematic plan view of another pipeline end manifold, according to one or more embodiments.

FIG. 11 depicts a schematic elevation view of yet another illustrative single point mooring terminal 1101, including another illustrative buoy 1015, according to one or more embodiments. FIG. 12 depicts a schematic plan view of another pipeline end manifold 1115, according to one or more embodiments. The pipeline end manifold 1115 can be located at a subsea location 1120 and can include the first pipeline end conduit 505 and the second pipeline end conduit 705 disposed on a dual skid 1110. The gas pipeline 430 can be in fluid communication with and span from the pipeline end manifold 1115 to another location, such as a near-shore or on-shore facility or location. The first floating conduit 110, the gas submarine conduit 140 (one is shown), the first pipeline end conduit 505, and the gas pipeline 430 can be adapted or configured to transfer or convey the gas from the floating vessel 104 and/or the vessel storage tank 410 to the near-shore or on-shore location.

The liquid pipeline 428 can be in fluid communication with and span from the pipeline end manifold 1115 to another location, such as the near-shore or on-shore facility or location. The liquid pipeline 428, the second pipeline end conduit 705, the liquid submarine conduit 145 (two are shown), and the second floating conduit 111 can be adapted or configured to convey the liquid, for example liquid hydrocarbons, from the near-shore or on-shore location to the floating vessel 104 and/or the vessel storage tank 410. The gas in the vessel storage tank 410 can be displaced from the vessel storage tank 410 simultaneously with the introduction of the liquid into the vessel storage tank 410.

In some examples, the gas submarine conduit 140 can be configured in a Chinese lantern configuration between the buoy 1015 and the subsea location 1120. The gas submarine conduit 140 can include one or more negatively buoyant members 162 coupled thereto (ten are shown) between the pipeline end manifold 1115 and the buoy 1015. In some examples, the one or more negatively buoyant members 162 can be coupled thereto between the pipeline end manifold 1115 and a midpoint of the gas submarine conduit 140. In other examples, one or more negatively buoyant members 162 can be coupled to the gas submarine conduit 140 between the pipeline end manifold 1115 and the midpoint of the gas submarine conduit 140 and one or more negatively buoyant members 162 can be coupled to the gas submarine conduit 140 between the midpoint and the buoy 1015.

The liquid submarine conduit 145 can be adapted or configured in a Chinese lantern configuration. For example, one or more positively buoyant members 164 can be distributed along the third submarine conduit 446 and the fourth submarine conduit 447 to maintain the liquid submarine conduit 145 in the Chinese lantern configuration. One or more positively buoyant members 164 and one or more negatively buoyant members 162 can be distributed along the third submarine conduit 446 and the fourth submarine conduit 447 to maintain the liquid submarine conduit 145 in the Chinese lantern configuration. The liquid submarine conduit 145 can be adapted or configured to convey the liquid from the subsea location 1120, e.g., the pipeline end manifold 1115, to the fluid swivel assembly 117.

It should be understood that rather than a single point mooring marine terminal, other types of mooring systems can be used to moor the floating vessel during transfer or conveyance of the gas from the vessel to the subsea location. In some examples, the vessel can be moored via a spread mooring system during conveyance of the gas from the vessel to the subsea location. A suitable spread mooring system can include the disconnectable spread mooring and riser tower system disclosed in U.S. patent application Ser. No. 16/527,345. In other examples, the vessel can be moored via anstabilized mooring system such as the stabilized mooring system disclosed in U.S. Patent Application No. 62/888,940. In other examples, the vessel can be moored via a disconnectable tower yoke mooring system such as those disclosed in U.S. Pat. No. 9,650,110 and Patent Application Nos. 62/830,082; and 62/830,088.

The present disclosure further relates to any one or more of the following numbered embodiments:

1. A single point mooring marine terminal, comprising: a buoy floating in water; a fluid swivel assembly coupled to the buoy; a gas submarine conduit; and a pipeline end manifold located at a subsea location, wherein: the gas submarine conduit is configured to transfer a gas between the fluid swivel assembly and the pipeline end manifold, the gas submarine conduit comprises one or more negatively buoyant members coupled thereto, and the one or more negatively buoyant members coupled to the gas submarine conduit urge the gas submarine conduit toward a seafloor to maintain the gas submarine conduit in a Chinese lantern configuration.

2. The marine terminal of paragraph 1, wherein the gas submarine conduit is configured to transfer the gas from the fluid swivel assembly to the pipeline end manifold.

3. The marine terminal of paragraphs 1 or 2, further comprising: a liquid submarine conduit, wherein: the liquid submarine conduit is configured to transfer a liquid from the pipeline end manifold to the fluid swivel assembly, the liquid submarine conduit comprises one or more positively buoyant members coupled thereto between the pipeline end manifold and the fluid swivel assembly, and the one or more positively buoyant members urge the liquid submarine conduit away from the seafloor.

4. The marine terminal according to any of paragraphs 1 to 3, wherein: the gas submarine conduit is a first submarine conduit, the marine terminal further comprising: a second submarine conduit, wherein: the first and second submarine conduits are each configured to transfer a portion of the gas between the fluid swivel assembly and the pipeline end manifold, the second submarine conduits comprises one or more negatively buoyant members coupled thereto, and the one or more negatively buoyant members coupled to the second submarine conduit urge the second submarine conduit toward a seafloor to maintain the first and second submarine conduits in a Chinese lantern configuration.

5. The marine terminal according to any of paragraphs 1 to 4, wherein the gas comprises an exhaust gas.

6. The marine terminal according to any of paragraphs 1 to 5, wherein the pipeline end manifold located at the subsea location is a first pipeline end manifold located at a first subsea location, the marine terminal further comprising: a third submarine conduit; a fourth submarine conduit; and a second pipeline end manifold located at a second subsea location, wherein: the third and fourth submarine conduits are each configured to transfer a liquid from the second pipeline end manifold to the fluid swivel assembly, the third and fourth submarine conduits each comprise one or more positively buoyant members coupled thereto between the second pipeline end manifold and the fluid swivel assembly, and the one or more positively buoyant members urge each submarine conduit away from the seafloor.

7. The marine terminal according to any of paragraphs 1 to 6, further comprising: a rotatable turntable coupled to the buoy, wherein: the fluid swivel assembly is coupled to the rotatable turntable, and the fluid swivel assembly comprises a first swivel section rotatably coupled to a second swivel section; a first liquid transfer conduit; a second liquid transfer conduit; and a gas transfer conduit; wherein: the third and fourth submarine conduits are in fluid communication with a first flow path defined by the second swivel section, the first and second submarine conduits are in fluid communication with a second flow path defined by the second swivel section, the first swivel section and the second swivel section are configured to maintain fluid communication between the first and second liquid transfer conduits and the third and fourth submarine conduits, respectively, during rotation therebetween, the first swivel section and the second swivel section are configured to maintain fluid communication between the gas transfer conduit and the first and second submarine conduits during rotation therebetween, and the gas transfer conduit, the fluid swivel assembly, and the first and second submarine conduits are configured to transfer the gas from a vessel storage tank to the first pipeline end manifold.

8. The marine terminal according to any of paragraphs 1 to 7, wherein the third and fourth submarine conduits are independently configured in a Chinese lantern configuration, a steep-S configuration, or a lazy-S configuration between the buoy and the second subsea location.

9. The marine terminal according to any of paragraphs 1 to 8, wherein the third and fourth submarine conduits are each configured in a steep-S configuration or a lazy-S configuration between the buoy and the second subsea location.

10. The marine terminal according to any of paragraphs 1 to 9, wherein the first pipeline end manifold is configured to receive the gas from the first and second submarine conduits, and wherein the second pipeline end manifold is configured to introduce a liquid into the third and fourth submarine conduits.

11. The marine terminal according to any of paragraphs 1 to 10, wherein the third submarine conduit and the fourth submarine conduit are each in fluid communication at a first end with the second pipeline end manifold and are each in fluid communication at a second end with the vessel storage tank.

12. The marine terminal according to any of paragraphs 1 to 11, wherein the first and second submarine conduits are free of any positive buoyancy members configured to increase a buoyancy of the first and second submarine conduits between the buoy and the midpoint of each submarine conduit.

13. The marine terminal according to any of paragraphs 1 to 12, wherein the first and second submarine conduits are each in fluid communication at a first end with the pipeline end manifold and are each in fluid communication at a second end with the vessel storage tank.

14. The marine terminal according to any of paragraphs 1 to 13, further comprising a gas transfer conduit, wherein the gas transfer conduit is in fluid communication at a first end with the fluid swivel assembly and in fluid communication at a second end with the gas submarine conduit.

15. The marine terminal according to any of paragraphs 1 to 14, wherein the gas transfer conduit is configured to provide a pressure drop across a transition between the gas transfer conduit and the gas submarine conduit.

16. The marine terminal according to any of paragraphs 1 to 15, wherein the one or more negatively buoyant members are coupled to the gas submarine conduit between the pipeline end manifold and a midpoint of the gas submarine conduit.

17. A process for transferring a fluid through a single point mooring marine terminal, comprising: displacing a gas from a vessel storage tank by flowing a liquid into the vessel storage tank; and flowing the gas from the vessel storage tank through a floating buoy to a gas pipeline end manifold located subsea, wherein: the gas flows through a gas transfer conduit that is in fluid communication with the vessel storage tank and the floating buoy, through the buoy, and through a gas submarine conduit that is in fluid communication with the floating buoy and the gas pipeline end manifold, and the gas submarine conduit is configured in a Chinese lantern configuration between the floating buoy and the gas pipeline end manifold.

18. The process of paragraph 17, wherein the floating buoy comprises a rotatable turntable, wherein the rotatable turntable comprises a fluid swivel assembly coupled thereto, and wherein the fluid swivel assembly comprises a first swivel section rotatably coupled to a second swivel section.

19. The process of paragraph 17 or 18, wherein the liquid flows from a liquid pipeline end manifold located subsea, through the floating buoy, and into the vessel storage tank.

20. The process according to any of paragraphs 17 to 19, wherein the liquid from the second pipeline end manifold flows through a liquid submarine conduit that is in fluid communication with the liquid pipeline end manifold and the floating buoy, through the buoy, and through a liquid transfer conduit that is in fluid communication with the floating buoy and the vessel storage tank.

21. The process according to any of paragraphs 17 to 20, wherein the liquid submarine conduit is configured in a Chinese lantern configuration, a steep-S configuration, or a lazy-S configuration between the buoy and the second subsea location.

22. The process according to any of paragraphs 17 to 21, wherein the liquid submarine conduit is configured in a steep-S configuration or a lazy-S configuration between the buoy and the second subsea location.

23. The process according to any of paragraphs 17 to 22, wherein: the floating buoy comprises a rotatable turntable, the rotatable turntable comprises a fluid swivel assembly coupled thereto, the fluid swivel assembly comprises a first swivel section rotatably coupled to a second swivel section, the first swivel section and the second swivel section are configured to maintain fluid communication between the liquid transfer conduit and the liquid submarine conduit during rotation therebetween, and the first swivel section and the second swivel section are configured to maintain fluid communication between the gas transfer conduit and the gas submarine conduit during rotation therebetween.

24. The system or process according to any of paragraphs 1 to 23, wherein the gas comprises an exhaust gas, air, an inert gas, a hydrocarbon gas, or any mixture thereof.

25. The system or process according to any of paragraphs 1 to 24, the liquid comprises raw hydrocarbons such as crude oil or a fraction thereof, refined hydrocarbons such as, but not limited to, diesel fuel, jet fuel, kerosene, and/or gasoline, water, or any mixture thereof.

26. The system or process according to any of paragraphs 1 to 25, wherein the buoy is a single point mooring marine terminal.

27. A process for transferring a fluid through a single point mooring marine terminal, comprising: displacing a gas from a vessel storage tank by flowing a liquid into the vessel storage tank; and flowing the gas from the vessel storage tank through a floating buoy to a gas pipeline end manifold located subsea, wherein: the floating buoy comprises a rotatable turntable comprising a fluid swivel assembly coupled thereto, the displaced gas flows through a gas transfer conduit that is in fluid communication with the vessel storage tank and the fluid swivel assembly, through the fluid swivel assembly, and through a gas submarine conduit that is in fluid communication with the fluid swivel assembly and the gas pipeline end manifold, the gas submarine conduit is configured in a Chinese lantern configuration between the floating buoy and the gas pipeline end manifold, the liquid flows from a liquid pipeline end manifold located subsea, through a liquid submarine conduit that is in fluid communication with the liquid pipeline end manifold and the fluid swivel assembly, through the fluid swivel assembly, and through a liquid transfer conduit that is in fluid communication with the fluid swivel assembly and the vessel storage tank, and the liquid submarine conduit is configured in a Chinese lantern configuration, a steep-S configuration, or a lazy-S configuration between the buoy and the second subsea location.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A process for transferring a fluid through a single point mooring marine terminal, comprising:
    displacing a gas from a vessel storage tank by flowing a liquid into the vessel storage tank, wherein the gas comprises an exhaust gas from the vessel, wherein the exhaust gas comprises one or more contaminants, and wherein the one or more contaminants comprise an oxide of sulfur, an oxide of nitrogen, or a mixture thereof; and
    flowing the gas from the vessel storage tank through a buoy floating on a surface of a body of water to a gas pipeline end manifold located subsea, wherein:
        the gas flows through a gas transfer conduit that is in fluid communication with the vessel storage tank and the buoy, through the buoy, and through a gas submarine conduit that is in fluid communication with the buoy and the gas pipeline end manifold,
        the gas submarine conduit comprises one or more negatively buoyant members coupled thereto, and
        the one or more negatively buoyant members coupled to the gas submarine conduit urge the gas submarine conduit toward a seafloor to maintain the gas submarine conduit in a Chinese lantern configuration between the buoy and the gas pipeline end manifold.

2. The process of claim 1, wherein the buoy comprises a rotatable turntable, wherein the rotatable turntable comprises a fluid swivel assembly coupled thereto, and wherein the fluid swivel assembly comprises a first swivel section rotatably coupled to a second swivel section.

3. The process of claim 1, wherein the liquid comprises liquid hydrocarbons, and wherein the liquid flows from a liquid pipeline end manifold located subsea, through the buoy, and into the vessel storage tank.

4. The process of claim 3, wherein the liquid from the liquid pipeline end manifold flows through a liquid submarine conduit that is in fluid communication with the liquid pipeline end manifold and the floating buoy, through the buoy, and through a liquid transfer conduit that is in fluid communication with the buoy and the vessel storage tank.

5. The process of claim 4, wherein the liquid submarine conduit is configured in a Chinese lantern configuration, a steep-S configuration, or a lazy-S configuration between the buoy and the second subsea location.

6. The process of claim 4, wherein the liquid submarine conduit is configured in a steep-S configuration or a lazy-S configuration between the buoy and the second subsea location.

7. The process of claim 4, wherein:
the buoy comprises a rotatable turntable,
the rotatable turntable comprises a fluid swivel assembly coupled thereto,
the fluid swivel assembly comprises a first swivel section rotatably coupled to a second swivel section,
the first swivel section and the second swivel section are configured to maintain fluid communication between the liquid transfer conduit and the liquid submarine conduit during rotation therebetween, and
the first swivel section and the second swivel section are configured to maintain fluid communication between the gas transfer conduit and the gas submarine conduit during rotation therebetween.

8. A process for transferring a fluid through a single point mooring marine terminal, comprising:
displacing a gas from a vessel storage tank by flowing a liquid into the vessel storage tank, wherein the gas comprises an exhaust gas from the vessel, wherein the exhaust gas comprises one or more contaminants, and wherein the one or more contaminants comprise an oxide of sulfur, an oxide of nitrogen, or a mixture thereof; and flowing the gas from the vessel storage tank through a buoy floating on a surface of a body of water to a gas pipeline end manifold located subsea, wherein:
the buoy comprises a rotatable turntable comprising a fluid swivel assembly coupled thereto,
the displaced gas flows through a gas transfer conduit that is in fluid communication with the vessel storage tank and the fluid swivel assembly, through the fluid swivel assembly, and through a gas submarine conduit that is in fluid communication with the fluid swivel assembly and the gas pipeline end manifold,
the gas submarine conduit comprises one or more negatively buoyant members coupled thereto,
the one or more negatively buoyant members coupled to the gas submarine conduit urge the gas submarine conduit toward a seafloor to maintain the gas submarine conduit in a Chinese lantern configuration between the floating buoy and the gas pipeline end manifold,
the liquid flows from a liquid pipeline end manifold located subsea, through a liquid submarine conduit that is in fluid communication with the liquid pipeline end manifold and the fluid swivel assembly, through the fluid swivel assembly, and through a liquid transfer conduit that is in fluid communication with the fluid swivel assembly and the vessel storage tank, and
the liquid submarine conduit is configured in a Chinese lantern configuration, a steep-S configuration, or a lazy-S configuration between the buoy and the second subsea location.

\* \* \* \* \*